Jan. 20, 1953 R. P. GUTTERMAN 2,626,029
SPRING TYPE OVERLOAD RELEASE CLUTCH
Filed Jan. 9, 1946 3 Sheets-Sheet 2
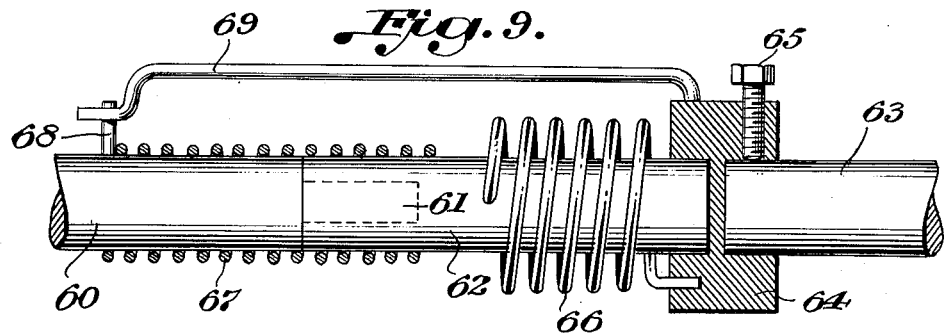
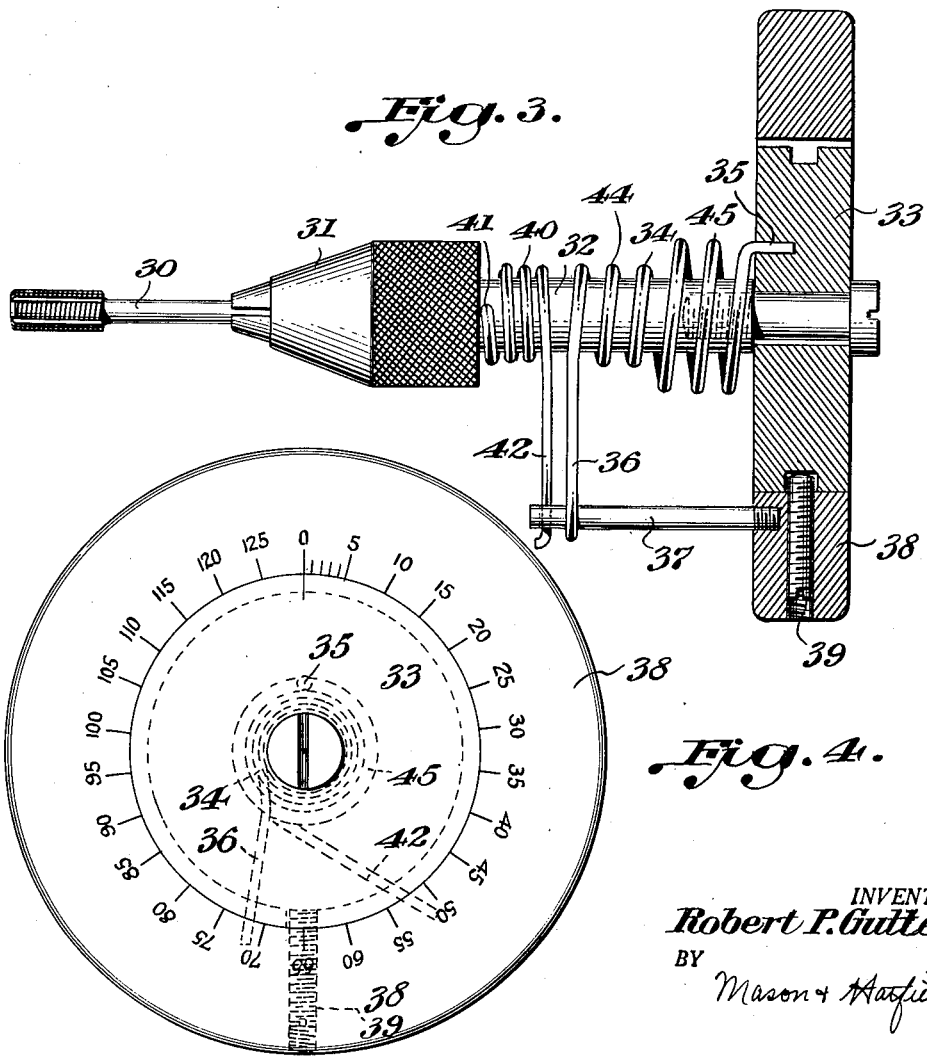
INVENTOR.
Robert P. Gutterman,
BY Mason & Hatfield
ATTYS.

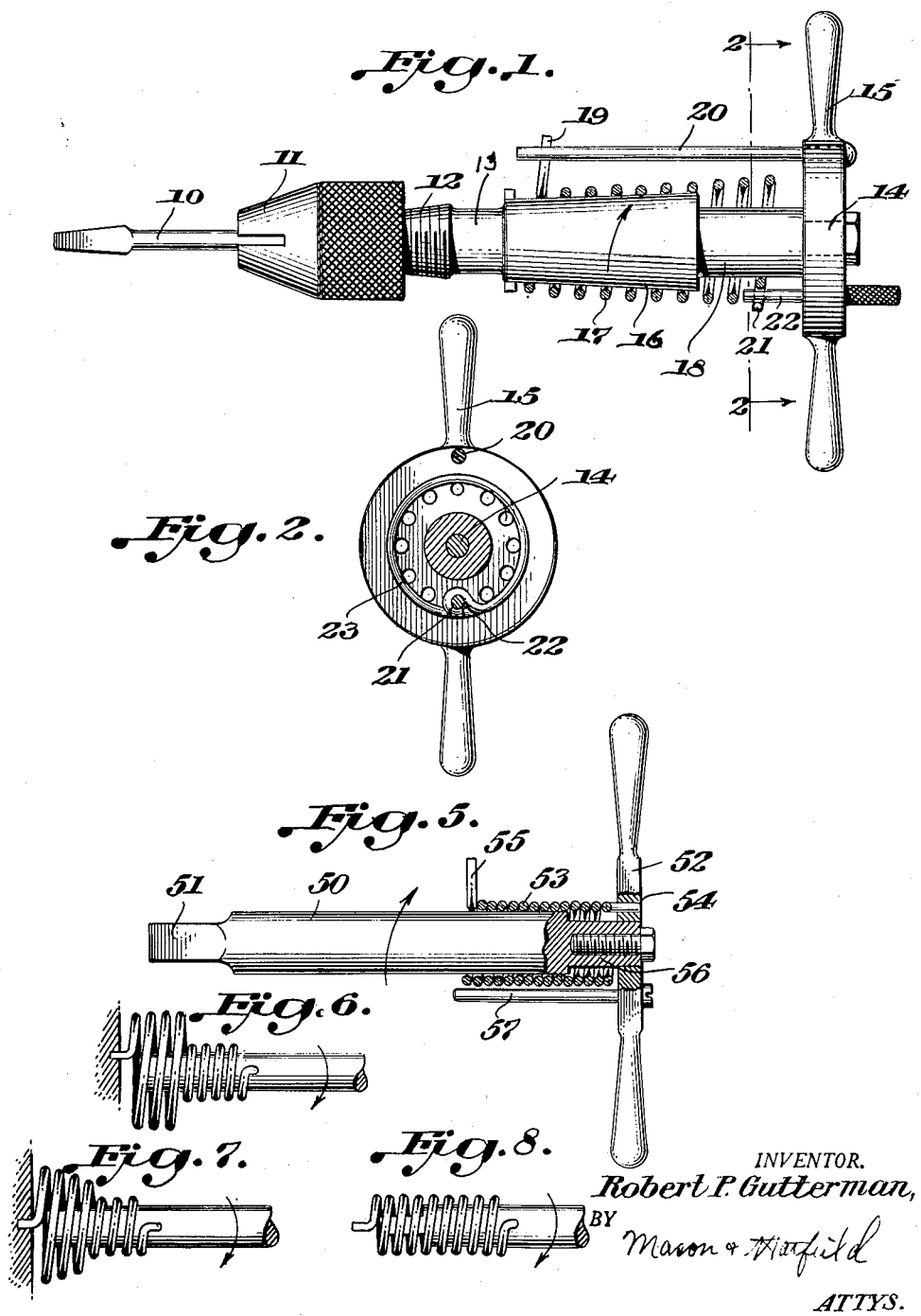

Jan. 20, 1953 R. P. GUTTERMAN 2,626,029
SPRING TYPE OVERLOAD RELEASE CLUTCH
Filed Jan. 9, 1946 3 Sheets-Sheet 3
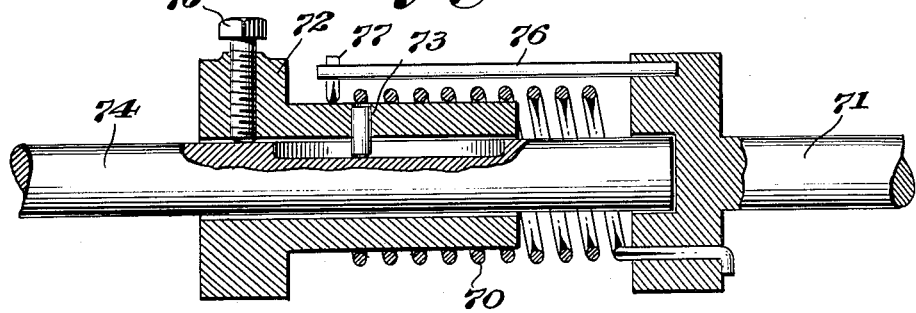
Fig. 10.
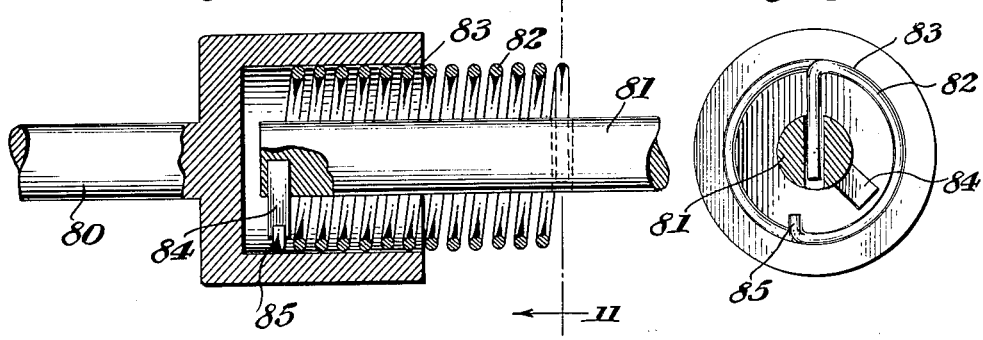
Fig. 11.
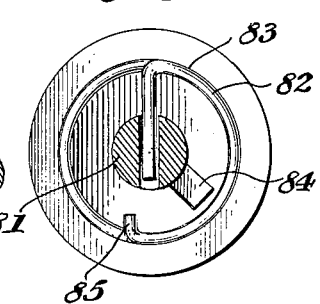
Fig. 12.
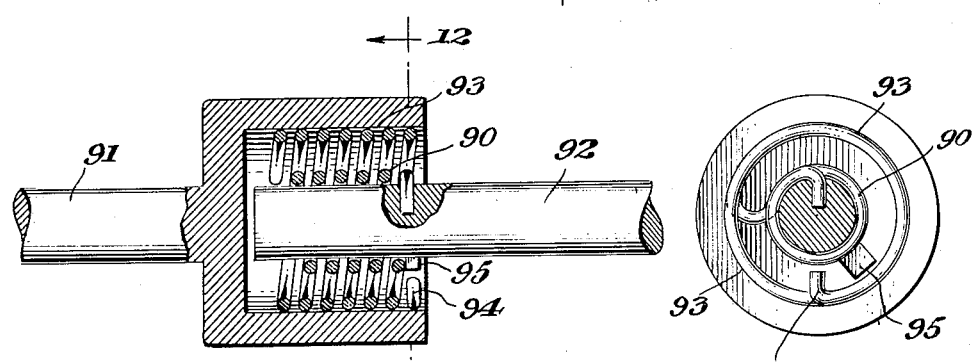
Fig. 13.
Fig. 14.
INVENTOR.
Robert P. Gutterman,
BY Mason + Hatfield
ATTYS.

Patented Jan. 20, 1953

2,626,029

UNITED STATES PATENT OFFICE 2,626,029

SPRING TYPE OVERLOAD RELEASE CLUTCH

Robert P. Gutterman, Arlington, Va.

Application January 9, 1946, Serial No. 639,981

20 Claims. (Cl. 192—56)

The present invention relates to torque limiting or overload release clutches.

The principal object of this invention is to provide a simple and economical form of torque limiting clutch having a positively acting means for automatically limiting the torque transmitted by the clutch to a predetermined amount and for preventing the application of additional torque over the predetermined amount between the driving member and the driven member.

A further object of this invention is to provide a torque limiting overload release clutch with means for positively and automatically partially disconnecting the clutch connection whenever the transmitted torque closely approaches or exceeds a predetermined amount, the disconnecting means being so designed that a re-connection is automatically and smoothly established whenever the applied or transmitted torque again becomes equal to or less than the predetermined amount.

It is also an important object of this invention to provide a torque limiting clutch with an adjustable and positively acting overload release means for limiting the transmitted torque to an adjustable predeterimned amount, the overload release means being so designed as to automatically connect the driving and driven members whenever the transmitted torque is equal to or less than the predetermined amount.

It is a still further object of this invention to provide a torque limiting or overload release clutch having a spring gripping clutch member and a positively acting release member for relieving the spring gripping action whenever the applied torque exceeds a predetermined limited amount which may be adjustably determined by an adjusted position of the release member relative to the clutch member.

Still a further important object of the invention is to provide a clutching member which will perform all of the above mentioned objects wherein the clutching connection between the driving and driven members is continuously smooth at all times and wherein the usual vibration or chattering of a clutch member of this general type is eliminated.

It is known that a torque may be transmitted through a helical spring and that the transmitted torque is directly proportional to the angular displacement between the ends of the spring. This invention employs a helical spring gripping clutch member to frictionally grip the driven member during the same time at which a relative angular movement between the ends of the spring is permitted and provides means for relieving the friction grip after an adjustably predetermined relative angular movement of the spring ends has been obtained. Thus, a limit to the transmitted torque which is proportioned to the limit of the predetermined angular spring movement is obtained upon the operation of the overload release. At all times when the predetermined angular movement between the spring ends is not exceeded, the driving grip is positive in action. When the predetermined angular movement between the spring ends is exceeded, the clutch will transmit only a constant torque proportioned to and determined by this angular movement, any excess power due to increased speed of the power source being dissipated as frictional heat between the helical clutch spring and the driven member.

Further objects and advantages of this invention will be apparent to those skilled in the art by reference to the following specification and drawings in which:

Figure 1 is a side elevation of one form of the invention as applied to a torque limiting screwdriver;

Fig. 2 is a section on the line 2—2 of Fig. 1;

Fig. 3 is a side elevation of another form of the invention having means for reversely turning the driven member in addition to the direction in which an overload release is obtained;

Fig. 4 is an end view of Fig. 3 showing in detail the calibrated means for adjusting the limit of the transmitted torque;

Fig. 5 is a side elevation partly in section of a form of the invention similar to Fig. 1;

Figs. 6, 7 and 8 are side elevations showing different configurations for the clutch springs used in Figs. 1 and 3;

Fig. 9 is a side elevation of a modified form of the invention;

Fig. 10 is a side elevation partly in section of another form of the invention;

Figs. 11 and 12 are side elevations partly in section of other forms of the invention;

Fig. 13 is a section on the line 11—11 of Fig. 11; and

Fig. 14 is a section on the line 12—12 of Fig. 12.

Referring to Figs. 1 and 2 of the drawings, an overload release or torque limiting clutch of this invention is shown to be applied to a screw driver 10 or other tool which may be gripped in the jaws of the chuck 11. The chuck 11 may be suitably fastened by threads 12 as shown to one end of a shaft 13 which may be termed a driven member. The other end of the shaft 13 is provided with a reduced diameter portion 14 on which is rotatably mounted the handle 15 which may be termed the driving member. The shaft 13 is also provided with the tapered surfaces 16 about which is positioned the tapered helical clutch spring 17. The reduced diameter portion 18 of the shaft 13 prevents the coils of the spring 17 nearest the handle 15 from gripping the shaft 13 and these coils may therefore be called free coils. The end of the spring adjacent the tapered surfaces 16 is bent outward as shown at 19 to cooperate, as will be described, with a pawl member 20 fixed to the handle 15. The other end 21 of the spring is shaped as more clearly shown in Fig. 2 of the drawings to connect with a pawl 22 which may be adjustably located in predetermined angular position about the axis of the shaft 13. Thus, the angular displacement between the positions of the pawls 20 and 22 about the axis of the shaft 13 may be adjusted by placing the pawl 22 through different selected ones of the holes 23 in the body of the handle 15.

When the handle 15 is rotated in a clockwise direction the pawl 22 is engaged with the end 21 of the spring which tends to displace the relative ends of the spring by twisting the free coils and this displacement is resisted by the resilience of the spring to cause the entire spring to be rotated. When the spring is rotated in the direction of the aforesaid rotation of the handle 15 the spring coils adjacent the tapered surface 16 of the shaft 13 are caused to be contracted and frictionally grip the shaft 13 and therefore cause its rotation. Since, as previously stated, a few of the spring coils adjacent the handle end of the shaft 13 are not in contact with the shaft, an angular displacement between the respective ends of the spring is permitted at the same time that the spring 17 and shaft 13 are rotated. As should be readily understood the relative angular displacement of the free coils and between the respective ends of the spring is directly proportional to the amount of torque being applied and transmitted through the spring 17 from the driving member 15 to the driven member 13. After a predetermined amount of angular displacement between the respective ends of the spring 17 and hence a predetermined torque limit, the handle 15 will have been angularly displaced relative to the shaft 13 sufficiently to bring the pawl 20 into engagement with the end 19 of the spring 17 and cause the spring coils about the tapered surfaces 16 to be expanded, thus relieving the major portion of the frictional grip and releasing or partially releasing the clutch at the desired or predetermined torque limit. By changing the relative angular positions of the pawls 20 and 22 about the axis of the shaft 13 and hence the angular displacement between the positions of pawls 20 and 22, the permitted angular displacement between the respective ends of the spring 17 is changed to thus change the torque limit or amount of overload at which the clutch is released or partially released. It should be noted that the pawl 20 cooperates with the spring end 19 in a manner to cause the spring coils to expand and positively prevent the application of additional torque only upon exceeding the predetermined torque limit. Whenever the angular movement between the ends of the spring is less than the predetermined amount, the gripping coils will positively grip the shaft 13 and transmit the torque.

The form of the invention shown in Figs. 3 and 4 of the drawings is similar to that just described but further provides for a means of turning the tool 30 in a direction opposite to the direction of rotation in which the torque limiting action is obtained. The tool chuck 31 is fastened to one end of the shaft 32 to the other end of which is rotatably fastened the handle disk 33. The clutch spring 34 is provided with a number of grip coils 44 in engagement with the shaft 32 and a number of free coils not engaging the surface of the shaft as shown. The end of the spring adjacent the free coils is fastened at 35 to the handle 33. The other end of the spring 34 is extended as at 36 to cooperate with a pawl member 37 fixed to the ring member 38 concentrically mounted around the handle disk 33. A set screw 39 adjustably fastens the ring member 38 to the handle disk 33 with the pawl 37 in a predetermined angular position about the axis of the shaft 32 relative to the spring end 35. A back-up spring 40, wound in a direction opposite to the clutch spring 34, is placed on the shaft 32 so that its coils frictionally engage shaft 32. The end 41 of spring 40 is left free to move relative to the shaft 32, while the other end 42 of the spring 40 is extended as shown and attached to and moves with the pawl 37. Thus, when the handle 33 and ring member 38 are moved together in a clockwise direction, the spring 40 will slip relative to the shaft 32. However, when the handle 33 and ring member 38 are moved together in a reverse or counterclockwise direction, the spring 40 will positively grip the shaft 32 and allow the tool 30 to be turned in the reverse direction with no torque limitation, all of the applied torque being transmitted to the shaft 32 through the pawl 37 and the spring end 42 of spring 40. Thus, the embodiment of the invention shown in Figs. 3 and 4 provides a means for applying an adjustably limited torque to a tool, such as the tapping tool 30, when turned in a clockwise or positive direction, as well as a means for applying an unlimited torque to the tool 30 when turned in reverse or counterclockwise direction. The handle disk 33 and the ring 38 may be provided with calibrations such as shown in Fig. 4 to indicate the position of the concentric ring 38 around the handle disk 33 and hence the relative angular position between the pawl 37 and the spring end 35 which determines the amount or limit of torque to be transmitted by the clutch.

Upon turning the handle 33 in a clockwise direction, the free coils 45 of the spring 34 will be twisted to relatively displace the ends of the spring and at the same time the spring coils 44 adjacent the shaft 32 will be contracted and rotated to grip and rotate the shaft 32. After the free coils 45 have been twisted an amount proportional to the desired torque limit and sufficient to permit a predetermined relative angular movement of the handle 33 and shaft 32 such as will bring the pawl 37 in contact with the spring end 36, the gripping coils 44 will be expanded to release or partially release the clutch, so that the application of additional torque is prevented.

With reference to Fig. 5 of the drawings in which is shown a form of overload release clutch similar to that described in connection with Figs. 1 and 2 of the drawings, the driven shaft 50 is provided with the working surfaces 51 on one end and a freely rotatable handle or driving member 52 on the other end. The clutch coil spring 53 is fastened at 54 to the handle 52 and the other end 55 of the spring 53 is extended as shown. The coil spring 53 surrounds and contacts the shaft 50 except around the shouldered end 56 where such coils of the spring do not contact the shaft 50 and may be called the free coils. The pawl member 57 is fastened to the handle 52 and extends along the spring as shown for contact with the spring end 55. The angular position of the pawl 57 about the shaft 50 relative to the angular position of the spring end 54 may, if desired, be adjustable by a method similar to that shown in Figs. 1 and 2. Upon turning the handle 52 in a clockwise direction the spring 53 will be rotated and be caused to grip and rotate the driven member or shaft 50. At the same time the free coils of the spring 53 will be twisted to allow an angular displacement between the spring ends by an amount proportional to the applied torque. When the applied torque and hence the relative displacement between the spring ends is sufficient to have allowed a predetermined relative movement between the handle 52 and shaft 50 about which the majority of the spring coils are gripping, the pawl 57 will contact the spring end 55 to expand the spring coils and release or partially release the clutch, so that the application of additional torque is prevented.

Figs. 6, 7 and 8 show various forms of clutch springs and driven shafts to provide for the free spring coils and the frictional gripping spring coils which are of the essential features of the invention. It should be obvious that the clutch spring or driven shaft may take various forms in order to provide the clutch spring with a number of free coils in addition to the gripping coils. It should also be obvious that the arrangements described herein may be reversed in order that the overload release clutch may be caused to function in a counterclockwise direction of rotation.

In the modified form of the invention shown in Fig. 9 of the drawings, a separate free coil spring is provided to allow for a predetermined relative angular movement proportional to the predetermined torque. The driven shaft 60 is provided with a reduced diameter end portion 61 around which is freely rotatably mounted an intermediate shaft 62. The driving means includes a shaft 63 which is provided with a collar 64 which may be fixed to the shaft 63 in a predetermined angular relation by the set-screw 65 and includes the intermediate shaft 62. The so-called free coil spring 66 is fastened at one end to the collar 64 and at the other end to the intermediate shaft 62 and functions to transmit rotation from shaft 63 to shaft 62 while at the same time permitting a relative angular movement between shafts 62 and 63 which will be proportional to the applied torque. Closely surrounding shafts 62 and 60 is the clutch spring 67 having the extended end 68 and its opposite end secured to shaft 62, either by frictional engagement therewith, or by any suitable connection means. A pawl member 69 adapted to cooperate with the spring end 68 is fastened to the collar 64.

Upon rotating the driving shaft 63 in a clockwise direction the intermediate shaft 62 is caused to be rotated which through the clutch spring 67 rotates the driven shaft 60. At the same time the free coil spring 66 functions to permit a relative angular movement between the shaft 63 and shafts 62 or 60 and whenever such angular movement corresponding to a predetermined torque limit is reached, the pawl 69 will contact the spring end 68 to expand the spring coils 67 around the shaft 60 and disconnect or partially disconnect the clutch, so that the application of additional torque is eliminated. The predetermined torque limit may be adjusted by loosening the set screw 65 and changing the angular position of the collar 64 about the shaft 63 to increase or decrease the tension on the torque responsive free coil spring 66 and to change the relative angular positions of the pawl 69 and spring end 68.

In Fig. 10 of the drawings, the clutch spring 70 is fastened to the driving shaft 71 and frictionally grips a collar 72 keyed at 73 to the driven shaft 74. The number of free coils on the clutch spring 70 is determined by the axial position of the collar 72 on the shaft 74 which may be fixed at a desired position by the set screw 75. In this form of the invention the predetermined angular movement between the spring ends is fixed and is not adjustable. The torque limit may be adjustably determined, however, by varying the number of free coils on the spring and hence the spring tension tending to oppose the torque causing the relative displacement in the angular position of the spring ends. Therefore, by changing the axial position of the collar 72 to change the number of free coils, the torque limit for the clutch may be changed at which torque limit the pawl 76 contacts the spring end 77 to expand the spring gripping coils and disconnect or partially disconnect the clutch.

In Figs. 11 through 14 of the drawings a form of the invention in which the clutch spring coils expand into gripping relation with the driven member is shown instead of the previously described type in which the clutch spring coils are contracted into clutching relation. As shown in Figs. 11 and 13, the driven shaft 80 is provided with a socket end into which extends in coaxial relation the driving shaft 81. In Figs. 11 and 13 of the drawings a clutch spring 82 is fastened at one end to the shaft 81 and extends into and in contacting relation with the interior walls 83 of the socket on the driven shaft 80. It will be seen that a number of free coils are provided on the spring 82 which permits a relative angular displacement in a clockwise direction between the spring ends which will be proportional to the applied torque in such direction. Whenever the relative displacement exceeds a predetermined amount sufficient to cause the pawl 84 to contact the spring end 85, the gripping coils will be contracted away from the walls 83 of the socket to disconnect or partially disconnect the clutch.

In Figs. 12 and 14 a more compact arrangement is shown since the clutch spring 90 is doubly wound to be completely enclosed within the socket of the driven shaft 91. The spring 90 is fastened at one end to the driving shaft 92 and its large diameter coils frictionally engage the inside walls 93 of the driven shaft socket. The end of the spring at 94 is extended inward to cooperate with a pawl member 95 whenever the predetermined angular displacement between the spring ends corresponding to the applied torque limit is reached. With this arrangement the free coils of the clutch spring are those coils adjacent the surface of the driving shaft 92.

In the expansion forms, means may be provided similar to that used with the contracting spring type of clutch for varying the torque limit by adjustably determining the amount of relative angular movement between the spring ends after which the clutch is disconnected or by varying the number of free coils to accomplish the same purpose.

The foregoing description has disclosed a new and novel form of overload release or torque limiting clutch device employing a spring gripping clutch member having a portion of the spring free to be angularly displaced in proportion to the applied torque to be limited, the predetermined displacement being adapted to cause the spring clutch to be released or partially released from gripping relation whenever the predetermined applied torque limit is reached. Obviously, the invention is capable of many forms and modifications within the scope of the appended claims.

I claim:

1. An overload release clutch mechanism comprising a driving means, a driven member, a clutch member including a coil spring, said coil spring being positioned to contact in clutching relation with said driven member for a selected direction of rotation and secured at one end thereof to said driving means, means fastened to said driving means to contact the other end of said spring after a predetermined angular displacement in the selected direction of rotation between the driving means and driven member occurs to prevent application of additional torque between said driving means and driven member, which angular displacement is proportional to the transmitted torque.

2. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, which angular displacement is proportional to the transmitted torque.

3. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, said last named means being adjustable to vary the predetermined angular displacement after which the clutch is disconnected.

4. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, said last named means being fastened to an adjustable angular position on said driving member with respect to said driven member.

5. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, and means to vary the relative angular positions about the driven shaft of said last named means and the end of said spring that is connected to said driving member.

6. An overload release clutch mechanism comprising a driving member, a driven shaft, a clutch member including a coil spring, a proportionate number of the coils of said spring being positioned to contract in clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, which angular displacement is proportional to the transmitted torque.

7. An overload release clutch mechanism comprising a driving member, a driven shaft, a clutch member including a coil spring, a proportionate number of the coils of said spring being positioned to contract in clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driving shaft said angular displacement being proportional to the transmitted torque, said last named means being adjustable to vary the predetermined angular displacement after which the clutch is disconnected.

8. An overload release clutch mechanism comprising a driving member, a driven shaft, a clutch member including a coil spring, a proportionate number of the coils of said spring being positioned to contract in clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, said last named means being fastened to an adjustable angular position on said driving member with respect to said driven member.

9. An overload release clutch mechanism comprising a driving member, a driven shaft, a clutch member including a coil spring, a proportionate number of the coils of said spring being positioned to contract in clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, and means to vary the relative angular positions about the driven shaft of said last named means and the end of said spring that is connected to said driving member.

10. An overload release clutch mechanism comprising a driving member, a driven shaft, a clutch member including a coil spring, a proportionate number of the coils of said spring being positioned to expand into clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, which angular displacement is proportional to the transmitted torque.

11. An overload release clutch mechanism comprising a driving member, a driven shaft, a clutch member including a coil spring, a proportionate number of the coils of said spring being positioned to extend into clutch relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, said last named means being adjustable to vary the predetermined angular displacement after which the clutch is disconnected.

12. An overload release clutch mechanism comprising a driving member, a driven shaft, a clutch member including a coil spring, a proportionate number of the coils of said spring being positioned to extend into clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, said last named means being fastened to an adjustable angular position on said driving member with respect to said driven member.

13. An overload release clutch mechanism comprising a driving member, a driven shaft, a clutch member including a coil spring, a proportionate number of the coils of said spring being positioned to extend into clutching relation with said driven shaft when rotated in a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft said angular displacement being proportional to the transmitted torque, and means to vary the relative angular positions about the driven shaft of said last named means and the end of said spring that is connected to said driving member.

14. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, adjustable means to vary said proportionate number of coils, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, which angular displacement is proportional to the transmitted torque.

15. An overload release clutch mechanism comprising a driving shaft, an intermediate shaft, a driven shaft, said driving shaft being connected to said driven shaft through a spring connection, said intermediate shaft and said driven shaft being coaxially aligned, a clutch spring surrounding the adjacent ends of said driven and intermediate shafts, said clutch spring adapted to contract and clutch said surrounded shafts upon a selected direction of rotation, and means fastened to said driving shaft to contact the end of said clutch spring surrounding said driven shaft after a predetermined angular displacement in the selected direction of rotation between the driving shaft and the intermediate shaft to thereby expand the clutch spring coils and partially disconnect the clutch, which angular displacement is proportional to the transmitted torque.

16. An overload release clutch mechanism comprising a driving shaft, an intermediate shaft, a driven shaft, said driving shaft being connected to said driven shaft through a spring connection, said intermediate shaft and said driven shaft being coaxially aligned, a clutch spring surrounding the adjacent ends of said driven and intermediate shafts, said clutch spring adapted to contract and clutch said surrounded shafts upon a selected direction of rotation, and means fastened to said driving shaft to contact the end of said clutch spring surrounding said driven shaft after a predetermined angular displacement in the selected direction of rotation between the driving shaft and the intermediate shaft to thereby expand the clutch spring coils and disconnect the clutch, said last named means being adjustable to vary the predetermined angular displacement after which the clutch is partially disconnected.

17. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, and a second spring means fastened at one end to said driven shaft and adapted to cooperate at the other end with said last named means whereby the driven shaft may be reversely rotated by the driving member.

18. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, said last named means being adjustable to vary the predetermined angular displacement after which the clutch is disconnected, and a second spring means fastened at one end to said driven shaft and adapted to cooperate at the other end with said last named means whereby the driven shaft may be reversely rotated by the driving member.

19. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils partially out of clutching relation with said driven shaft, said last named means being fastened to an adjustable angular position on said driving member with respect to said driven member, and a second spring means fastened at one end to said driven shaft and adapted to cooperate at the other end with said last named means whereby the driven shaft may be reversely rotated by the driving member.

20. An overload release clutch mechanism comprising a driving member, a driven shaft, a clutch member including a coil spring, a proportionate number of the coils of said spring being positioned to contact in clutching relation with said driven shaft for a selected direction of rotation, the other coils of said spring being free of said driven shaft, the end of said spring adjacent said free coils being connected with said driving member, means fastened to said driving member to contact the opposite end of said spring after a predetermined angular displacement in the selected direction of rotation between the driving member and driven member and hence the ends of said spring to thereby move said proportionate number of coils out of clutching relation with said driven shaft, and means to vary the relative angular positions about the driven shaft of said last named means and the end of said spring that is connected to said driving member, and a second spring means fastened at one end to said driven shaft and adapted to cooperate at the other end with said last named means whereby the driven shaft may be reversely rotated by the driving member.

ROBERT P. GUTTERMAN.

REFERENCES CITED

The following references are of record in the file of this patent:

UNITED STATES PATENTS

| Number | Name | Date |
|---|---|---|
| 1,298,395 | Proctor | Mar. 25, 1919 |
| 1,561,537 | Hayes | Nov. 17, 1925 |
| 1,932,000 | Starkey | Oct. 24, 1933 |
| 2,050,613 | Kellogg | Aug. 11, 1936 |
| 2,151,724 | Wengel et al. | Mar. 28, 1939 |
| 2,360,187 | Almen | Oct. 10, 1944 |
| 2,468,193 | Goff | Apr. 26, 1949 |
| 2,510,667 | Starkey | June 6, 1950 |